(12) United States Patent
Sargeant et al.

(10) Patent No.: US 6,194,075 B1
(45) Date of Patent: Feb. 27, 2001

(54) WATER INSOLUBLE ABSORBENT COATING MATERIALS

(75) Inventors: Steven J. Sargeant, West Warwick; Shengmei Yuan, Coventry, both of RI (US); Yang Chen, McKinney, TX (US)

(73) Assignee: Arkwright, Incorporated, Fiskevill, RI (US)

( * ) Notice: Subject to any disclaimer, the term of this patent is extended or adjusted under 35 U.S.C. 154(b) by 0 days.

(21) Appl. No.: 09/095,755

(22) Filed: Jun. 11, 1998

(51) Int. Cl.⁷ ........................................................ B41M 5/00
(52) U.S. Cl. ...................... 428/447; 428/195; 428/478.2; 428/478.8; 428/480; 428/500; 428/522
(58) Field of Search ...................................... 428/195, 522, 428/447, 448, 327, 331, 478.2, 478.8, 480, 500

(56) References Cited

U.S. PATENT DOCUMENTS

| | | |
|---|---|---|
| 4,678,468 | 7/1987 | Hiroyoshi . |
| 5,219,928 | 6/1998 | Stofko, Jr. et al. . |
| 5,411,787 * | 5/1995 | Kulkarni ................................ 428/195 |

* cited by examiner

*Primary Examiner*—Pamela R. Schwartz
(74) *Attorney, Agent, or Firm*—Birch, Stewart, Kolasch & Birch, LLP

(57) ABSTRACT

A water insoluble absorbent coating material comprising a water-insoluble network prepared by combining at least one silicon-containing monomer, at least one water- and solvent-soluble polymer, and, optionally, at least one acidic catalytic component, is provided. A water-insoluble absorbent coating material suitable for use as an ink receptive coating layer in an ink jet film is also provided as are ink jet recording media containing such ink receptive coating layers.

12 Claims, No Drawings

WATER INSOLUBLE ABSORBENT COATING MATERIALS

FIELD OF THE INVENTION

This invention relates to a water-insoluble absorbent coating material prepared by a sol-gel process, and more particularly to a water-insoluble absorbent material suitable for use as an ink receptive coating for an ink jet film.

BACKGROUND OF THE INVENTION

The sol-gel process is a condensation polymerization process, wherein metal alkoxides are hydrolyzed to generate intermediate species of metal hydroxides, and then the metal hydroxides undergo a stepwise polycondensation reaction to form a three dimensional network. The gelling compositions also can contain solvent and additional constituents such as metal alkoxides, polymers, and metal salts. The process has been used in the preparation of processable glasses, ceramics, optical materials and protective coatings on metals. For a further description of this process, see *Sol-Gel Science The Physics and Chemistry of Sol-Gel Processing*, by C. Jeffrey Brinker and George W. Scherer, 1990, Academic Press, Inc.

This disclosure describes the incorporation of suitable polymeric binders into the sol-gel process to produce a novel class of water insoluble absorbent coatings. This novel class of water insoluble absorbent coating materials comprises silica, solvent- and water-soluble polymers, and acid catalysts. The present inventive materials show unexpectedly advantageous properties for ink jet media and other applications.

No current art provides such a material. U.S. Pat. No. 5,219,928 discloses a liquid-absorbent composition that comprises cross-linked silanol moieties that are provided as part of the monomeric units used in the formation of a matrix component polymer or are grafted into the polymer after the formation of the polymeric backbone. The cross-links are limited to the matrix components that use cross-linkable polymers incorporating silanol groups therein.

SUMMARY OF THE INVENTION

It is an object of the present invention to provide a novel water insoluble absorbent coating material. It is a further object of the present invention to provide a novel water insoluble ink absorbent material that can be used in an ink-receptive coating layer in an ink jet film.

In accordance with the objects of the invention, there is provided a coating material comprising a water insoluble network prepared by combining at least one silicon-containing monomer, at least one water- and solvent-soluble polymer, and, optionally, at least one acidic catalytic component. The present inventive water insoluble absorbent coating material is an inorganic-organic hybrid of organic polymer and metal gel.

DETAILED DESCRIPTION

The following detailed description is provided as an aid to those desiring to practice the present invention as claimed. As such the Examples and embodiments disclosed herein are not intended to be limitative to the scope of the invention set forth in the claims appended hereto, or the equivalent embodiments thereof that are encompassed thereby.

The present invention provides a water insoluble absorbent coating material prepared by combining at least one silicon-containing monomer, at least one water- and and solvent-soluble polymer, and, optionally, at least one acidic catalytic component. The formed material is water insoluble and liquid absorbent, including ink absorbent, and forms a glassy solid. The water- and solvent-soluble polymer dissolves in the same solvent as is released from the silicon-containing monomer during the condensation polymerization of the organic polymer with the silicon-containing monomer in the sol-gel reaction, and as a result the prepared materials are quite stable.

As a silicon-containing monomer, the present inventors have cross-linked tetraethoxysilane (TEOS) along with an organic component, in the presence of an acid catalyst, using a sol-gel process, to form inorganic-organic composites. A poly(2-ethyl-oxazoline) (PEOX)-TEOS system was prepared which possesses ink receiving, water resistance, and good materials compatibility properties. Further, a PEOX-TEOS system is disclosed herein, which when combined with a dye fixing agent, such as a quaternary polymer (for example, Syntran HX31-44), results in a waterfast coating. In addition to ink jet media applications, the present inventive materials may be used in a variety of applications including the production of printing plates, opacifying layers, and conductive coatings.

As an organic water soluble polymer for use in the present invention, seven water soluble organic polymers are specifically noted and were investigated for use in forming the inorganic-organic composite through a sol-gel process. These were PEOX, poly(acrylic acid)(PAA), poly(vinyl pyrrolidone)(PVP), poly(vinyl alcohol)(PVOH), poly (ethylene glycol)(PEG), vinyl alcohol/vinyl amine copolymer (VAVA), and gelatin. TEOS was used as the inorganic component, and p-toluenesulfonic acid (PTSA) was used to catalyze the sol-gel process.

The investigative procedure for PEOX and PEG involved dissolving an appropriate amount of polymer in ethanol to make a 25% (by weight) solution, then adding a measured amount of water and TEOS, respectively, with stirring. The acidity of the solution was adjusted by adding a small amount of PTSA. The solution was mixed thoroughly and coated onto a poly(ethylene terephthalate) (PET) film using a number 70 Mayer rod and dried in an oven at a certain temperature for 10 minutes. The investigative procedure for PVOH, PAA, VAVA, and gelatin involved first dissolving the polymer in water, and then adding ethanol, PTSA, and TEOS, respectively, with stirring. The solution was mixed thoroughly and coated onto a poly(ethylene terephthalate) (PET) film using a number 70 Mayer rod and dried in an oven at a certain temperature for 10 minutes.

Table I, below, sets forth the investigated formulations.

TABLE I

| System | System Formulations | | | | | OVEN TEMP |
|---|---|---|---|---|---|---|
| | TEOS | POLYMER | ETHANOL | WATER | PTSA | |
| | (Concentration, % by weight) | | | | | |
| PEOX-1 | 12.46 | 21.27 | 63.51 | 2.17 | 0.59 | 160° C. |
| PEOX-2 | 21.81 | 18.79 | 55.04 | 3.77 | 0.59 | 150° C. |
| PEOX-3 | 28.86 | 16.98 | 48.58 | 4.99 | 0.59 | 150° C. |
| PVOH-1 | 3.80 | 18.98 | 8.98 | 56.93 | 1.33 | 120° C. |
| PVOH-2 | 5.20 | 17.33 | 24.26 | 51.99 | 1.21 | 120° C. |
| PVOH-3 | 9.88 | 16.47 | 23.06 | 49.42 | 1.15 | 120° C. |
| PEG-1 | 0.45 | 22.27 | 75.72 | 0.00 | 1.56 | 150° C. |
| PEG-2 | 5.07 | 23.99 | 68.54 | 0.00 | 2.40 | 150° C. |
| PVP | 22.47 | 15.12 | 60.48 | 0.87 | 1.06 | 150° C. |
| PAA | 6.98 | 6.98 | 46.51 | 39.53 | 0.00 | 150° C. |

From the investigation above, PEOX-2 was determined to be the most advantageous system, and as such the water resistance of the PEOX system was studied at ambient temperature (about 25° C.) on coated films that had been heated at the temperatures specified in Table II. These temperatures and the water resistance properties are set forth in Table II below. The water resistance of the coatings was tested by immersing a piece of the coated film in water overnight at ambient temperature.

TABLE II

Effect of Drying Temperature on Water Resistance of PEOX System

| System | 140° C. | 150° C. | 160° C. | 180° C. |
|---|---|---|---|---|
| PEOX-1 | dissolved | dissolved | good | swelled |
| PEOX-2 | dissolved | good | swelled | swelled |
| PEOX-3 | dissolved | swelled | swelled | swelled |

An inverse relationship has been found between the percentage of TEOS in the system and the coating treatment temperature, which is the temperature at which a coating is well-formed in a time appropriate to production. When the coating liquid comprises a higher percentage of TEOS, a lower treatment temperature is used than when a lower percentage of TEOS is present. Thus, in the PEOX-1 system, which has 12.46% TEOS, the optimum treatment temperature is 160° C., while in PEOX-2, which has 21.81% TEOS, the optimum treatment temperature is 150° C. The coated film has been found to degrade at treatment temperatures that are significantly higher than 160° C. The coating-formation reactions do not form fast enough at 140° C. for this temperature to be useful in a manufacturing environment.

Infra-red spectral data were obtained for the PEOX-1 and PEOX-2 systems. This data is shown in Table III below. The spectrum of PEOX alone shows a strong, sharp C=O peak, and broad O—H stretching peaks in the 1635 cm$^{-1}$ and 3520$^{-1}$ regions. In the spectrum of silica (the polymerization product of TEOS), there were two sharp peaks in the 1100–100cm$^{-1}$ region, which coincide with Si—O—Si vibrations. These characteristic peaks are present in the spectra of the PEOX systems.

When the percentage of TEOS increased (from 12% to 22%), the ratio, R, of the Si—O—Si in the 1635 cm$^{-1}$ and C=O in the 1066 cm$^{-1}$ band intensities, increased (from 0.63 to 0.99). In addition, in the spectra of the PEOX systems, there was a peak in the 964 cm$^-$region, which belongs to Si—O—C stretching in TEOS. This is indicative of some residual TEOS. The boiling point of TEOS is 168° C.

TABLE III

FT-IR Spectral Data[1]

| Assign | TEOS | Silica | PEOX-1 | PEOX-2 |
|---|---|---|---|---|
| O—H | / | / | 3520b | 3515b |
| C=O | / | / | 1634s | 1629s |
| Si—O—Si | / | 1037-1008s | / | 1077s |
| Si—O—C | 963s | / | / | 963m |

[1]s: strong; b: broad; m: medium

Glass Transition Temperatures (Tg) and decomposition temperatures (Td) were obtained from DSC and TGA. The results are given in Table IV, below. The Tg of the PEOX/TEOS systems was compared with the Tg of the PEOX-IPTSA system (typically, acid will influence the Tg, so a minute quantity of PTSA was added). The Tg increased from 60° C. to 70° C. For the PEOX/TEOS systems, the Tg increases from 67° C. to 75° C. The percentage of TEOS increases in these systems from 12% to 29%.

The Td of the PEOX systems was greater than 300° C., indicating good thermal stability.

TABLE IV

Tg and Td Data (° C.)

| Sample | Oven Temp. | Tg | Td |
|---|---|---|---|
| PEOX/PTSA | 160 | 61 | 392 |
| PEOX-1 | 160 | 67 | 250 |
| PEOX-3 | 160 | 74 | 335 |
| PEOX-2 | 140 | 69 | 342 |
| PEOX-2 | 150 | 70 | 347 |
| PEOX-2 | 160 | 67 | 335 |
| PEOX-2 | 180 | 67 | 343 |

The IR data indicates that small segments of siloxane may cross-link with the PEOX. These cross-linked segments may act as a filler reinforcement to increase the Tg of the system. In addition, residual TEOS may exist in the PEOX systems. The reaction temperature is the key factor affecting the PEOX system.

Eight quaternary polymers were tested in the PEOX-2 system. The formulations are given in Table V, below.

TABLE V

Formulations for Quaternary Polymer Screening

| Sample | QUATS | PEOX | TEOS | ETHANOL (Weight %) | WATER | PTSA |
|---|---|---|---|---|---|---|
| Syntran HX 31-44 | | | | | | |
| I | 3.49 | 16.51 | 19.63 | 49.54 | 0.91 | 0.92 |
| II | 5.24 | 15.59 | 18.54 | 45.53 | 14.23 | 0.87 |
| III | 6.83 | 14.77 | 17.55 | 44.30 | 15.71 | 0.83 |
| Syntran HX 31-66 | | | | | | |
| I | 2.01 | 17.91 | 21.63 | 53.91 | 4.65 | 0.10 |
| II | 3.49 | 16.51 | 19.63 | 49.54 | 9.91 | 0.92 |
| Gafquat 755 | | | | | | |
| I | 1.74 | 14.15 | 16.82 | 62.48 | 4.38 | 0.43 |
| II | 1.97 | 16.49 | 19.64 | 53.64 | 7.88 | 0.48 |
| Gafquat 755N | | | | | | |
| I | 1.54 | 19.23 | 16.77 | 56.00 | 6.15 | 0.31 |
| II | 3.69 | 16.09 | 13.95 | 51.30 | 14.76 | 0.21 |

The quaternary polymers were added to the PEOX-2 system. The mixtures were coated onto a PET film using a number 70 Mayer rod and dried in an oven at 150° C. for 10 minutes. The prepared films were then printed on an HP DeskJet 850C. The image dry time was tested by using a 6 lb. small roller. The roller was rolled over a plain paper put on the image area to determine the time of no ink transfer. Dye fixing was tested by immersing a piece of the printed film in water overnight at ambient temperatures. Image and water fastness properties for the quaternary polymer systems are given in Table VI, below.

TABLE VI

Image Properties and Water Fastness

| Sample | Dry Time (minutes) | Coalescence[1] | Cracking[2] | Dye Fixing | Water Fastness |
|---|---|---|---|---|---|
| Syntran HX31-44 | | | | | |
| I | 1 | 7 | 7 | No | Yes |
| II | 1 | 5 | 5 | Yes | Yes |
| III | 3 | 3 | 5 | Yes | Yes |
| Syntran HX31-66 | | | | | |
| I | 2 | 7 | 7 | No | No |
| II | 1.5 | 10 | 10 | No | No |
| Gafquat-755 | | | | | |
| I | 1 | 9 | 4 | No | No |
| II | 2 | 6 | 4 | Yes | Yes |
| Gafquat-755N | | | | | |
| I | 1 | 9 | 4 | Yes | Yes |
| II | 1 | 9 | 4 | No | No |

[1]This is a visual evaluation of the printed media, with 10 representing the best result and 1 representing the worst.
[2]This is a visual evaluation of black ink cracking, with 10 representing the best and 1 representing the worst.

In a preferred embodiment of the present invention, an ink-receptive coating layer for an ink jet material is prepared as follows.

At least one silicon-containing monomer, at least one water- and solvent-soluble polymer, and, optionally, at least one acidic catalytic component, are combined to form an ink-receptive coating material having a water-insoluble network. The resultant ink-receptive coating layer is applied to a suitable base substrate such as polyethylene terephthalate, polyethylene coated paper, clay-coated paper, and the like, to form an ink jet material having excellent water fastness.

Coating can be conducted by any suitable means including roller coating, extrusion coating, wire-bar coating, dip-coating, rod coating, doctor coating, or gravure coating. Such techniques are well known in the art.

In order to more fully illustrate the various embodiments of the present invention, the following non-limiting examples are provided.

EXAMPLE 1

Ink Jet Coating

| | |
|---|---|
| TEOS[1] | 27.82 parts (final solid) |
| PEOX[2] | 21.27 parts |
| PTSA[3] | 0.59 parts |
| Ethanol | 63.51 parts |
| Water | 2.17 parts |

[1]Tetraethoxysilane (Aldrich Chemical).
[2]Poly(2-ethyl-oxazoline) (Polymer Chemistry Innovations).
[3]p-toluenesulfonic acid (Aldrich Chemical).

The above ingredients are mixed together to form a clear coating solution.

EXAMPLE 2

Ink Jet Film

The coating solution of Example 1 was coated onto a polyethylene terephthalate film using a number 70 wire wound rod. The coated film was dried in an oven at 160° C. for 10 minutes.

EXAMPLE 3
Ink Jet Coating

| | |
|---|---|
| TEOS[1] | 48.47 parts (final solid) |
| PEOX[2] | 18.35 parts |
| PTSA[3] | 1.03 parts |
| Ethanol | 55.04 parts |
| Water | 3.77 parts |

[1]Tetraethoxysilane (Aldrich Chemical).
[2]Poly(2-ethyl-oxazoline) (Polymer Chemistry Innovations).
[3]p-toluenesulfonic acid (Aldrich Chemical).

The above ingredients are mixed together to form a clear coating solution.

EXAMPLE 4
Ink Jet Film

The coating solution of Example 3 was prepared and coated onto a polyethylene terephthalate film using a number 70 wire wound rod, and the coated film was dried in an oven at 160° C. for 10 minutes.

EXAMPLE 5
Ink Jet Film

The coating solution of Example 3 was coated onto a polyethylene terephthalate film using a number 70 wire wound rod and the coated film was dried in an oven at 140° C. for 10 minutes.

EXAMPLE 6
Ink Jet Film

The coating solution of Example 3 was coated onto a polyethylene terephthalate film, and the coated film was dried in an oven at 150° C. for 10 minutes.

EXAMPLE 7
Ink Jet Coating

| | |
|---|---|
| TEOS[1] | 64.13 parts (final solid) |
| PEOX[2] | 16.19 parts |
| PTSA[3] | 1.37 parts |
| Ethanol | 48.58 parts |
| Water | 4.99 parts |

[1]Tetraethoxysilane (Aldrich Chemical).
[2]Poly(2-ethyl-oxazoline) (Polymer Chemistry Innovations).
[3]p-toluenesulfonic acid (Aldrich Chemical).

The above ingredients are mixed together to form a clear coating solution.

EXAMPLE 8
Ink Jet Film

The coating solution of Example 7 was coated onto a polyethylene terephthalate film using a number 70 wire wound rod, and the coated film was dried in an oven at 160° C. for 10 minutes.

EXAMPLE 9
Ink Jet Coating and Ink Jet Film

| | |
|---|---|
| TEOS[1] | 49.92 parts (final solid) |
| PVP K-90[2] | 15.12 parts |
| PTSA[3] | 1.06 parts |
| Ethanol | 60.48 parts |
| Water | 0.87 parts |

[1]Tetraethoxysilane (Aldrich Chemical).
[2]Polyvinylpyrrolidone (International Specialty Products).
[3]p-toluenesulfonic acid (Aldrich Chemical).

The above ingredients are mixed together to form a clear coating solution. The coating solution was coated onto a polyethylene terephthalate film using a number 70 wire wound rod, and the coated film was dried in an oven at 150° C. for 10 minutes.

EXAMPLE 10
Ink Jet Coating and Ink Jet Film

| | |
|---|---|
| TEOS[1] | 50.0 parts (final solid) |
| Ethanol | 100.0 parts |
| Water | 2.0 parts |
| GAF quat 734[2] | 43.0 parts |
| PTSA[3] | 6.0 parts |

[1]Tetraethoxysilane (Aldrich Chemical).
[2]Polyquaternium-11 (Rhone Poulenc).
[3]p-toluenesulfonic acid (Aldrich Chemical).

The above ingredients are mixed together to form a clear coating solution. The coating solution was coated onto a polyethylene terephthalate (PET) film (ICI PET film subbed with ICI 535 precoat) using a number 60 Mayer rod, and the coated film was dried in an oven at 150° C. for 10 minutes.

EXAMPLE 11
Ink Jet Coating and Ink Jet Film

| | |
|---|---|
| TEOS[1] | 50.0 parts (final solid) |
| Ethanol | 100.0 parts |
| Water | 2.0 parts |
| GAF quat 734[2] | 43.0 parts |
| PTSA[3] | 6.0 parts |

[1]Tetraethoxysilane (Aldrich Chemical).
[2]Polyquaternium-11 (Rhone Poulenc).
[3]p-toluenesulfonic acid (Aldrich Chemical).

The above ingredients are mixed together for 30 minutes on a stir plate to form a coating solution. The coating solution was applied to a PET film (ICI PET film subbed with ICI 535 precoat) using a number 60 Mayer rod, and the coated film was dried in an oven at 150° C. for 10 minutes.

The surface of the dried coating was smoother than that of Example 10, although a dim haze appeared. The film was not water fast.

EXAMPLE 12
Ink Jet Coating and Ink Jet Film

| | |
|---|---|
| TEOS[1] | 49.92 parts (final solid) |
| Ethanol | 60.48 parts |
| Water | 0.87 parts |

-continued

| | |
|---|---|
| PVP K90[2] | 10.50 parts |
| PTSA[3] | 1.06 parts |

[1]Tetraethoxysilane (Aldrich Chemical).
[2]Polyvinylpyrrolidone (International Specialty Products).
[3]p-toluenesulfonic acid (Aldrich Chemical).

The above ingredients are mixed together for 30 minutes on a stir plate to from a solution. The solution was applied to a PET film (ICI PET film subbed with ICI 535 precoat) with a number 60 Mayer rod, and the coated film was dried in an oven at 160° C. for 10 minutes. The surface of the dried coating was clear.

EXAMPLE 13
Ink Jet Coating and Ink Jet Film

| | |
|---|---|
| TEOS[1] | 50.0 parts (final solid) |
| Ethanol | 100.0 parts |
| Water | 2.0 parts |
| GAF quat 734[2] | 43.0 parts |
| PTSA[3] | 6.0 parts |
| Syntran Hx 31-44[4] | 20.0 parts |

[1]Tetraethoxysilane (Aldrich Chemical).
[2]Polyvinylpyrrolidone (International Specialty Products).
[3]p-toluenesulfonic acid (Aldrich Chemical).
[4]Quaternary amine-containing copolymer (Interpolymer Corporation).

The above ingredients are mixed together for 30 minutes on a stir plate to form a solution. The solution was applied to a PET film (ICI PET film subbed with ICI 535 precoat) with a number 60 Mayer rod, and the coated film was dried in an oven at 170° C. for 10 minutes. The surface of the dried coating was clear.

When printed on a Hewlett Packard Printer Model 870C, the produced print is slightly tacky, with good water fastness. A trace amount of ink comes off, but most of the ink is absorbed into the coating

EXAMPLE 14
Ink Jet Coating and Ink Jet Film

| | |
|---|---|
| TEOS[1] | 50.0 parts (final solid) |
| Ethanol | 100.0 parts |
| Water | 2.0 parts |
| GAF quat 734[2] | 43.0 parts |
| PTSA[3] | 6.0 parts |
| Triethanolamine | 10% by weight |

[1]Tetraethoxysilane (Aldrich Chemical).
[2]Polyquaternium-11 (Rhone Poulenc).
[3]p-toluenesulfonic acid (Aldrich Chemical).

The above ingredients are mixed together for 30 minutes on a stir plate to form a coating solution. The coating solution was applied to a PET film (ICI PET film subbed with ICI 535 precoat) using a number 60 Mayer rod, and the coated film was dried in an oven at 150° C. for 10 minutes.

The film was printed on a Hewlett Packard Printer Model 870C and tested for water fastness by immersing the printed film in water overnight at ambient temperatures. The coating remained attached to the film.

EXAMPLE 15
Opacifying Layer

| | |
|---|---|
| TEOS[1] | 49.92 parts (final solid) |
| Ethanol | 60.48 parts |
| Water | 0.87 parts |
| PVP K90[2] | 10.50 parts |
| FC-430[3] | 4% by weight (3.7% in water) |

[1]Tetraethoxysilane (Aldrich Chemical).
[2]Polyvinylpyrrolidone (International Specialty Products).
[3]Fluorad (fluorosurfactant) (Minnesota Mining and Manufacturing).

The above ingredients are mixed together for 30 minutes on a stir plate to form a solution. The solution was applied to PET film (ICI PET film subbed with ICI 535 precoat) with a number 60 Mayer rod, and the coated film was dried in an oven at 160° C. for 10 minutes.

This coating is matted with an opacity of 70.

The ink jet film was printed on a Hewlett Packard DJ870C printer. Where ink is absorbed into the coating, the coating turns clear.

EXAMPLE 16
Printing Plate Coating Layer

The present inventive ink absorbent material can be further modified for other uses. This example provides a coating formulation which may be advantageously applied to the preparation of printing plates.

| | |
|---|---|
| TEOS[1] | 44.19 parts (final solid) |
| PEOX[2] | 16.73 parts |
| PTSA[3] | 0.94 parts |
| Ethanol | 50.19 parts |
| Water | 19.87 parts |
| FK310[4] | 5.18 parts |
| Syloid 162[5] | 3.00 parts |

[1]Tetraethyoxysilane (Aldrich Chemical).
[2]Poly(2-ethyl-oxazoline) (Polymer Chemistry Innovations).
[3]p-toluenesulfonic acid (Aldrich Chemical).
[4]Silica particles (Deguessa).
[5]Silica particles (Grace Davison).

The silica particles are measured and added slowly to the PEOX system with stirring. After the silica particles are dispersed homogeneously in the solution, the mixture is coated onto a PET film using a number 70 Mayer rod, and the coated film is dried in an oven at 150° C. for 10 minutes.

EXAMPLE 17
Conductive Coating Layer

| | |
|---|---|
| Conductive Concentrate | |
| MEK[1] | 43.20 parts |
| Dowanol PM solvent[2] | 4.30 parts |
| L-20[3] | 30.00 parts |
| Antimony Doped Tin Oxide | 22.5 parts |

[1]Methyl ethyl ketone.
[2]Methoxy propanol (Dow Chemical Company)
[3]Propylene glycol monomethyl ether (Dow Chemical Company).

The above ingredients are mixed together with 150.0 grams 0.3 mm Z-beads in a glass bottle such as those suitable for use as paint shakers. The bottle is covered with electrical tape, placed in a well-padded paint can, and shaken in a paint shaker for 1 hour. The conductive concentrate is decanted from the glass jar without the beads and used in the preparation of the conductive lacquer.

| Conductive Lacquer | |
| --- | --- |
| Conductive Concentrate as described above | 42.96 parts |
| MEK[1] | 52.41 parts |
| PM solvent[2] | 2.10 parts |
| L-20[3] | 2.53 parts |

[1]Methyl ethyl ketone.
[2]Methoxy propanol (Dow Chemical Company)
[3]Propylene glycol monomethyl ether (Dow Chemical Company).

The above ingredients are combined and stirred for 5 minutes. The stirred solution is applied to a PET film (ICI PET film subbed with ICI 535 precoat) with a number 4 Mayer rod, and the coated film is dried in an oven at 135° C. for 1 minute. The resistivity of the obtained film is $2 \times 10^6$ log ohms (as measured with a Keithly Conductivity Meter).

EXAMPLE 18
Conductive Layer

| Conductive Concentrate | |
| --- | --- |
| MEK[1] | 43.20 parts |
| Dowanol PM solvent[2] | 4.30 parts |
| SP7[3] | 30.00 parts |
| Antimony Doped Tin Oxide | 22.5 parts |

[1]Methyl ethyl ketone.
[2](Dow Chemical Company)
[3]Copolymer of methyl methacrylate and hydroxy ethyl methacrylate (Allied Colloids).

The above ingredients are mixed together with 150.0 grams 0.3 mm Z-beads in a glass bottle such as those suitable for use as paint shakers. The bottle is covered with electrical tape, placed in a well-padded paint can, and shaken in a paint shaker for 1 hour. The conductive concentrate is decanted from the glass jar without the beads and used in the preparation of the conductive lacquer.

| Conductive Lacquer | |
| --- | --- |
| Conductive Concentrate as described above | 42.96 parts |
| MEK[1] | 52.41 parts |
| PM solvent[2] | 2.10 parts |
| SP7[3] | 2.53 parts |

[1]Methyl ethyl ketone.
[2](Dow Chemical Company)
[3]Copolymer of methyl methacrylate and hydroxy ethyl methacrylate (Allied Colloids).

The above ingredients are combined and stirred under high shear for 5 minutes. The stirred solution is applied to PET FILM (ICI 054 film, PET film pretreated with solvent adhereable pretreat) with a number 4 Mayer rod, and the coated film is dried in an oven at 135° C. for 1 minute. The resistivity of the obtained film is $1 \times 10^7$ log ohms.

As can be seen from the data presented in Table VII below, the properties of the ink jet recording films (e.g., waterfastness and dry time) prepared from the present inventive ink absorbent material may be altered by changes in the film preparation process.

TABLE VII
WATER FASTNESS AND DRY TIME

| Example | Water Fast | Dry Time |
| --- | --- | --- |
| 2 | Yes | 1 minute |
| 4 | No | >10 minutes |
| 5 | No | Does not absorb ink |
| 6 | No | Does not absorb ink |
| 8 | Yes | 2 minutes |
| 9 | Yes | 1 minute |

In Example 4, the coated film was dried in an oven at 160° C. for 10 minutes, and in this instance, the ink jet film prepared with the ink absorbent material of Example 3 was not waterfast and took more than 10 minutes to dry. Similarly, in Example 5, the coating formulation of Example 3 was coated onto a suitable substrate and dried at 140° C. for 10 minutes. The produced film did not exhibit waterfastness and did not absorb ink. In Example 6, however, the same coating formulation of Example 3 was coated on a film base and dried at 150° C. for 10 minutes, with this difference in processing (drying at 150° C. rather than 160° C.) resulting in a film which was waterfast and possessed a dry time of 1 minute.

Accordingly, it can be seen that the present inventive water insoluble absorbent materials may be processed variably in order to achieve different properties. For example, the water insoluble ink absorbent material of Example 1 may be used for ink jet printing applications while the water insoluble absorbent material of Example 3 may also be used in the preparation of anti-fog films, protective coatings, or other end uses, such as those provided in Examples 16–18 herein.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An ink jet recording medium comprising a substrate having an ink-receptive layer coated thereon, said layer comprising a water-insoluble polymer network comprising the reaction products of a mixture comprising a tetraalkoxysilane, water, and a water-soluble polymer selected from the group consisting of poly(2-ethyl-2-oxazoline), poly(acrylic acid), poly(vinyl pyrrolidone), poly (vinyl alcohol), poly(ethylene glycol), vinylalcohol/vinyl amine copolymer, and gelatin.

2. The ink jet recording medium of claim 1, wherein the water-soluble polymer is poly(2-ethyl-2-oxazoline).

3. The ink jet recording medium of claim 1, wherein the tetraalkoxysilane is selected from the group consisting of tetramethoxysilane, tetraethoxysilane, and tetraisopropoxide silane.

4. The ink jet recording medium of claim 3, wherein the tetraalkoxysilane is tetraethoxysilane.

5. The ink jet recording medium of claim 1, wherein the mixture further comprises an acidic catalytic component.

6. The ink jet recording medium of claim 5, wherein the acidic catalytic component is p-toluenesulfonic acid.

7. The ink jet recording medium of claim 1, wherein the mixture comprises poly(2-ethyl-2-oxazoline), tetraethoxysilane, and p-toluenesulfonic acid.

8. The ink jet recording medium of claim 1, wherein the mixture comprises about 50% to 85% by weight of the water-soluble polymer.

9. The ink jet recording medium of claim 1, wherein the mixture comprises about 15 to 50% by weight of the tetraalkoxysilane.

10. The ink jet recording medium of claim 1, wherein the mixture further comprises inorganic or organic particulate.

11. The ink jet recording medium of claim 1, wherein the substrate is a paper or film.

12. The ink jet recording medium of claim 11, wherein the substrate is a polyethylene terephthalate film.

* * * * *